United States Patent
Remy

(10) Patent No.: US 10,590,013 B2
(45) Date of Patent: Mar. 17, 2020

(54) TREATMENT OF PRODUCTION WATER FROM OIL FIELDS USING CHEMICALLY ASSISTED RECOVERY

(71) Applicant: S.P.C.M. SA, Andrezieux Boutheon (FR)

(72) Inventor: Pascal Remy, Andrezieux Boutheon (FR)

(73) Assignee: S.P.C.M. SA, Andrezieux Boutheon (FR)

(*) Notice: Subject to any disclaimer, the term of this patent is extended or adjusted under 35 U.S.C. 154(b) by 155 days.

(21) Appl. No.: 15/718,920

(22) Filed: Sep. 28, 2017

(65) Prior Publication Data

US 2019/0077681 A1 Mar. 14, 2019

(30) Foreign Application Priority Data

Sep. 12, 2017 (FR) ..................................... 17 58402

(51) Int. Cl.
| | |
|---|---|
| C02F 1/28 | (2006.01) |
| C09K 8/588 | (2006.01) |
| B01D 17/02 | (2006.01) |
| B01D 17/04 | (2006.01) |
| C02F 103/10 | (2006.01) |
| C02F 101/32 | (2006.01) |

(52) U.S. Cl.
CPC ........... *C02F 1/286* (2013.01); *B01D 17/0202* (2013.01); *B01D 17/045* (2013.01); *C09K 8/588* (2013.01); *C02F 2101/32* (2013.01); *C02F 2103/10* (2013.01)

(58) Field of Classification Search
None
See application file for complete search history.

(56) References Cited

U.S. PATENT DOCUMENTS

| | | | | |
|---|---|---|---|---|
| 3,992,291 A * | 11/1976 | Hirs | ..................... | B01D 17/045 210/795 |
| 2006/0096263 A1* | 5/2006 | Kahlbaugh | ........ | B01D 39/2024 55/527 |
| 2016/0347626 A1* | 12/2016 | Felch | ................... | B01D 17/045 |

FOREIGN PATENT DOCUMENTS

| | | |
|---|---|---|
| CN | 104261588 A | 1/2015 |
| CN | 106219797 A | 12/2016 |

* cited by examiner

*Primary Examiner* — Jeffrey D Washville
(74) *Attorney, Agent, or Firm* — Heslin Rothenberg Farley & Mesiti P.C.

(57) ABSTRACT

Treatment equipment for production water for a polymer-assisted oil recovery operation comprising at least two nutshell filters in series, where the first filter recovers the majority the oil and the second serves as a finisher.

20 Claims, 1 Drawing Sheet

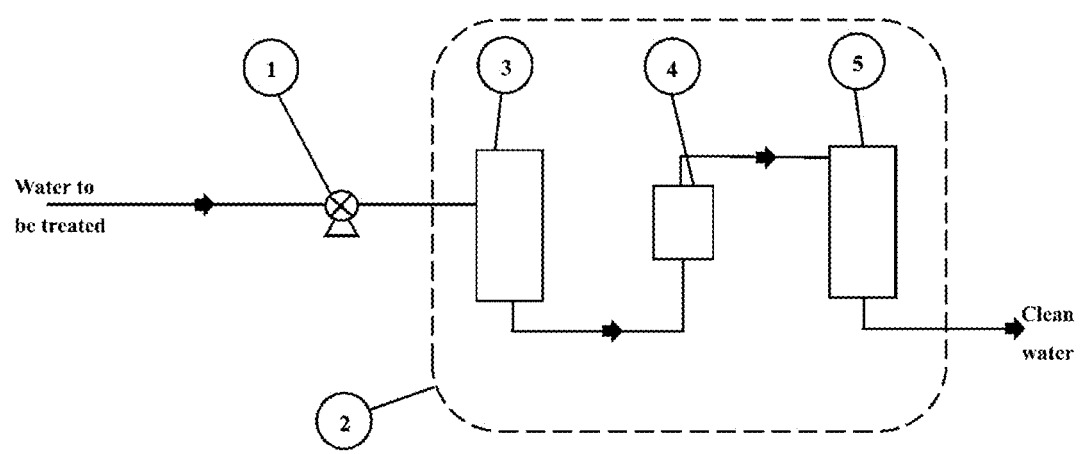

TREATMENT OF PRODUCTION WATER FROM OIL FIELDS USING CHEMICALLY ASSISTED RECOVERY

CROSS REFERENCE TO RELATED APPLICATIONS

This application claims priority to French Application No. 1758402, filed on Sep. 12, 2017, the entire contents of which are hereby incorporated herein by reference.

For 15 years, chemically enhanced oil recovery (EOR) has almost exclusively used polyacrylamides for viscosifying the injection water.

The results obtained with this technique have made it possible to extract on average 10% additional oil beyond the 30% average produced today.

The cost of treatment is greatly improved by the increase of the oil concentration in the production water, by 3 to 10 times, which greatly reduces the cost of the injected water compared to the oil produced, sometimes making the cost of EOR very low.

Generally, this result is obtained with a viscosity of the injected water comparable to the viscosity of the petroleum at the temperature of the field.

Additionally, by increasing this viscosity by 2 to 5 times, yields of the order of 20% can be obtained, which is extremely favorable for extraction from the field.

This result is even more favorable when the reinjection water does not contain oxygen, which degrades the polymer by a reduction-oxidation effect.

Additionally, the investment needed for dissolving and injecting the polymer is completely minor compared to the oil produced and especially compared to opening new fields.

However, a recurring problem is the treatment of the production water to allow its reinjection.

The fluid recovered from the underground formation contains water and oil. The oil can be coarsely separated from the water referred to as production water by a separation referred to as primary separation.

This production water, after static decanting in various types of settling tanks and in particular plate settlers, contains some quantity of oil, colloidal to varying degrees, and solid materials, usually wet and included in oil droplets.

The purpose is to reduce the quantity of oil in this water for reinjection.

The standard procedure for treating the water and making it re-injectable has two steps:
  Pre-separation by gas flotation, optionally with a coalescing or flocculation agent, to a hydrocarbon concentration of order 50 to 150 mg/L;
  Then filtration on a nutshell filter to reduce the concentration to the order of 5 to 10 mg/L for reinjection.

A nutshell filter is a filter containing crushed walnut or pecan shells (filtering medium) that absorb hydrocarbons. The absorbed oil can be recovered by backwashing. The backwashing is done very easily by using treated production water or even production water itself.

Usually, the cycle between two washings is one day, which defines the size of the unit. This washing is done by fluidization of the filtering medium with water and often with both fluidization and agitation. The recovered oil and the wash water are reintroduced at the beginning of the process. In some cases, the media are washed in an annex tank.

In enhanced oil recovery by polymer flooding, gas flotation does not work because the water is viscous; according to Stokes's law, the flotation speed varies depending on the viscosity of the water, which is 5 to 10 times greater than that of normal water. Devices 5 to 10 times larger would therefore be needed to obtain a result; this is inconceivable industrially.

Further, coalescence in this viscous water is greatly reduced, which impacts the yield.

Various solutions have been proposed to solve this problem:
  Precipitation of the anionic polyacrylamide by a cationic coagulant or flocculant encompassing the suspended oil. This solution is extremely costly and gives a very colloidal sludge that is difficult to treat.
  Reduction of the viscosity of the water by breakdown of the polymer, for example by on-site production of hypochlorite, by Fenton reaction, or by UV treatment. The cost in this case is also very high if the viscosity is to be reduced to the level of that of water and allow flotation.
  Replacement of flotation by centrifuging with a plate separator for example. The mechanics corresponding to the enormous volumes is prohibitive.
  The use of cyclones has failed until now because of the effect of viscosity. Some gas injection cyclones have however given limited results.
  Absorption of the polymer on various media runs into problems for regeneration, in particular by solvents, and the cost of these media.
  The method giving the best technical results is the use of ultrafiltration with ceramic membranes, which allows recovery of water and polymer in the permeate and oil plus water in the concentrate. But these installations require a large investment with fairly complicated cleaning problems.

In other words, all these systems are unsatisfactory for reasons of cost and/or logistics.

The best way to treat the production water in this case is to separate the oil and suspended materials on one side and the water with the soluble materials including the polymer on the other side. In fact such an operation allows recovery of the residual viscosity of the water and reduction of the quantity of additional polymer necessary to restore the viscosity of the water for new injection.

The subject of the invention is therefore treatment equipment of production water of an enhanced oil recovery operation by polymer flooding at the outlet of the primary separation, characterized in that it comprises at least two nutshell filters in series, where the first filter recovers the majority of the oil and the second serves as a finisher.

The subject of the invention is also a method for production water treatment at the outlet of the primary separation during an enhanced oil recovery operation by polymer flooding consisting, in the absence of a prior flotation step, of passing said production water in at least two nutshell filters in series.

Advantageously the nutshell filters have different sizes. In a preferred embodiment of the invention, the first has a size 3 to 8 times larger than the second. The first nutshell will recover 3 to 8 times more oil than the second in order to allow coordinated washings between the two units.

Whatever the size of the units, the principal is the same, with only a difference in cycle times.

In a preferred embodiment according to the invention, the first nutshell filter is replaced by two nutshell filters in parallel. This pretreatment with two nutshell filters in parallel allows more frequent filter washings without creating a stoppage of the second unit because at least one of the two pretreatment nutshell filters is operating.

The efficiency of these filters can be improved by incorporating a self-cleaning coalesce that increased the size of the oil droplets upstream from the first nutshell filter or between the two nutshell filters.

The subject of the invention is also a an enhanced oil recovery method by polymer flooding consisting of treating production water with the equipment according to the invention at the outlet of the primary separation.

The quality of the water treated that way is sufficient for considering its reuse in the preparation of an injection fluid for a new polymer-assisted oil recovery operation.

The invention and resulting benefits will become clear from the following example, supported by the attached FIG. 1.

FIG. 1 shows a schematic view of the production water treatment equipment according to the invention.

FIG. 1 shows an assembly comprising a variable speed volumetric pump (1) and the treatment unit according to the invention (2) comprising a first nutshell filter (3), a self-cleaning coalescer (4) and a second nutshell filter (5).

The example was implemented on a pilot unit.

In this demonstration unit, the two filters are identical. These are 406 mm diameter Prosep brand filters, with a usable height of about 1 m and a total height of 2.536 m.

The following are the properties of the production water after primary separation:

| | |
|---|---|
| Viscosity | 12 cps |
| Suspended oil concentration | 620 ppm |
| Suspended solids | 47 ppm |
| Polymer concentration | 700 ppm |

This suspension is pumped through the first nutshell filter at a flow rate of 1.5 m$^3$/hour with the following average results over a 12 hour period:

| | |
|---|---|
| Viscosity | 12 cps |
| Suspended oil concentration | 55 ppm |
| Suspended solids | 4 ppm |
| Polymer concentration | 700 ppm |

The size of the particles estimated at about 10% is slightly increased by passage over the coalescer.

The mixture is next sent over the second nutshell filter with the following result:

| | |
|---|---|
| Viscosity | 12 cps |
| Suspended oil concentration | 6 ppm |
| Suspended solids | <1 ppm |
| Polymer concentration | 700 ppm |

Within the precision of the measurements, it is noted that all the polymer was recovered and that the oil level was entirely satisfactory for reinjection.

The person skilled in the art will be able to vary various mechanical, physical or chemical parameters, in particular relating to:

The size of the units.

How many there are and how they are arranged.

The type of walnut or pecan shell and the particle size distribution. There are tens of types and particle size distributions with which to improve efficiency by selection.

The type of coalescer with very different constructions; the choice is made preferably based on a continuous, maintenance-free unit.

The invention claimed is:

1. Treatment equipment comprising at least two nutshell filters, a first nutshell filter comprising filtering media housed within a first container and a second nutshell filter comprising filtering media housed within a second container, in series, said first nutshell filter having the capacity to receive production water, said production water:

being viscosified by polyacrylamides; and having a hydrocarbon concentration in excess of 150 mg/L, wherein the first nutshell filter recovers a majority of oil from the production water, and water proceeds out of the first nutshell filter and subsequently into the second nutshell filter, which serves as a finisher, and wherein water leaving the second nutshell filter remains viscosified by polyacrylamides.

2. Equipment according to claim 1, wherein the size of the two nutshell filters is different, with the first having a size 3 to 8 times larger than the second.

3. Equipment according to claim 1, wherein the first nutshell filter is accompanied by a first' nutshell filter, and wherein the first and first' filters are two nutshell filters in parallel.

4. Equipment according to claim 1, additionally comprising a self-cleaning coalescer between the first nutshell filter and the second nutshell filter or upstream from the first nutshell filter.

5. Equipment according to claim 2, wherein the first nutshell filter is accompanied by a first' nutshell filter, and wherein the first and first' filters are two nutshell filters in parallel.

6. Equipment according to claim 2, additionally comprising a self-cleaning coalescer between the first nutshell filter and the second nutshell filter or upstream from the first nutshell filter.

7. Equipment according to claim 3, additionally comprising a self-cleaning coalescer between the first nutshell filter and the second nutshell filter or upstream from the first nutshell filter.

8. Equipment according to claim 5, additionally comprising a self-cleaning coalescer between the first nutshell filter and the second nutshell filter or upstream from the first nutshell filter.

9. An enhanced oil recovery method by polymer flooding, said method comprising treating production water with the equipment according to claim 1, wherein said treating occurs on production water from an enhanced oil recovery operation at the outlet of primary separation, such that said production water is not, following primary separation, subjected to gas flotation, and wherein said treating comprises passing the production water, following primary separation, into the first nutshell filter, and wherein, upon entering said first nutshell filter, the production water:

is viscosified by polyacrylamides; and has a hydrocarbon concentration in excess of 150 mg/L, such that the first nutshell filter recovers a majority of oil from the production water, and wherein water proceeds out of the first nutshell filter and subsequently into the second nutshell filter, which serves as a finisher, and wherein water leaving the second nutshell filter remains viscosified by polyacrylamides.

10. The method according to claim 9, wherein the size of the two nutshell filters is different, with the first having a size 3 to 8 times larger than the second.

11. The method according to claim 9, wherein the first nutshell filter is accompanied by a first' nutshell filter, and wherein the first and first' filters are two nutshell filters in parallel.

12. The method according to claim 9, wherein said equipment additionally comprises a self-cleaning coalescer between the first nutshell filter and the second nutshell filter or upstream from the first nutshell filter.

13. The method according to claim 10, wherein the first nutshell filter is accompanied by a first' nutshell filter, and wherein the first and first' filters are two nutshell filters in parallel.

14. The method according to claim 10, wherein said equipment additionally comprises a self-cleaning coalescer between the first nutshell filter and the second nutshell filter or upstream from the first nutshell filter.

15. The method according to claim 11, wherein said equipment additionally comprises a self-cleaning coalescer between the first nutshell filter and the second nutshell filter or upstream from the first nutshell filter.

16. The method according to claim 13, wherein said equipment additionally comprises a self-cleaning coalescer between the first nutshell filter and the second nutshell filter or upstream from the first nutshell filter.

17. The method according to claim 9, further comprising, after said treating, using the treated water as an injection fluid for enhanced oil recovery.

18. A method for preparing an injection fluid for an enhanced oil recovery by polymer flooding, said method comprising using the water treated by the method according to claim 9.

19. Equipment according to claim 1, wherein filtering media in the first nutshell filter consists of crushed walnut shells, crushed pecan shells, or a combination thereof.

20. Equipment according to claim 19, wherein filtering media in the second nutshell filter consists of crushed walnut shells, crushed pecan shells, or a combination thereof.

* * * * *